March 7, 1933. C. L. WAGNER ET AL 1,900,320
METHOD OF RECOVERING CHEMICALS FROM WASTE LIQUORS
Filed March 7, 1928

INVENTORS
Charles L. Wagner
Horace Freeman
BY
ATTORNEYS.

Patented Mar. 7, 1933

1,900,320

UNITED STATES PATENT OFFICE

CHARLES L. WAGNER, OF BOONTON, NEW JERSEY, AND HORACE FREEMAN, OF SHAWINIGAN FALLS, QUEBEC, CANADA, ASSIGNORS TO J. O. ROSS ENGINEERING CORPORATION, OF NEW YORK, N. Y., A CORPORATION OF NEW YORK

METHOD OF RECOVERING CHEMICALS FROM WASTE LIQUORS

Application filed March 7, 1928. Serial No. 259,891.

This invention relates to the production and recovery of chemicals, and more particularly the deoxidized chemicals, such for example, as sodium sulfide.

These reagents, employed in deoxidized form, as for example in the manufacture of paper are sodium sulfate for instance being converted into sodium sulfide. These chemicals are cheapest in the oxidized form. It is an object of this invention therefore to devise a process and apparatus by which the oxidized chemicals may be converted into the reduced form, in accordance with which it may be assured that the deoxidation may be substantially complete.

In the manufacture of paper the waste liquors, which are large in volume and carry a high proportion of dissolved carbonaceous matter contain a great deal of the oxidized reagents from the previous manufacture. It is a further object of the invention to devise a process and apparatus for the disposal of these waste liquors with a great economy of the chemicals, and heat units contained therein, and a better condition of the product.

It is a further object moreover to provide a process and apparatus for the reduction of chemicals, whether recovered from the waste liquors themselves or from other sources, which will utilize the heat of combustion of the carbonaceous matter of the waste liquors to create the reduction, all in a manner to insure that the reduction shall be complete.

In the copending application Serial No. 4,359, filed Jan. 24, 1925, there is shown a method of disposal of the wastes from paper manufacture in accordance with which the waste liquors are evaporated and destructively distilled by the heat resulting from the combustion of the products of the distillation.

In the destructive distillation above referred to there may be formed a mass of carbon at the bottom of the furnace which is consumed by the oxygen of the chemicals in the furnace and thereby maintained at a high temperature.

It is a further object of the invention to use the above phenomena for the deoxidation of the chemicals whether they come from the waste liquors themselves or whether the oxidized compounds be added as a distinct manufacturing step, and to so control the operation as to cause the completeness of reduction.

The liquors are carried through the furnace with great rapidity, whereas it has been found that the complete deoxidation of the chemicals requires an appreciable period of time. It is an object of this invention, therefore, to retain the chemicals under deoxidizing conditions until the reduction is complete. It is also important that the chemicals, while retained in the furnace, shall be prevented from contact with the hot oxidizing gases within the furnace, and to accomplish these results without too great a height of fuel in the furnace.

These results may be achieved by retaining within the furnace a considerable body or pool of the molten chemical. This pool being more dense than the carbon mass causes the latter to float upon it. There results a very efficient contact between the mass and the pool which facilitates the reduction. The carbon mass also serves as a blanket to prevent contact between the oxidizing gases in the furnace and the molten mass. This makes it feasible to retain the molten chemicals within the furnace for an appreciable time, particularly since the interstices between the carbonaceous particles are largely filled with deoxidizing carbonaceous gases, such for example as carbon monoxide which assists in the reduction.

The invention accordingly comprises the various steps and elements and the relation of each to the other as herein described, and the scope of the application of which will be indicated in the claims, it being understood that the specific disclosure given herein is intended as illustrative and not in a limiting sense.

In the drawing:—

Figure 1:
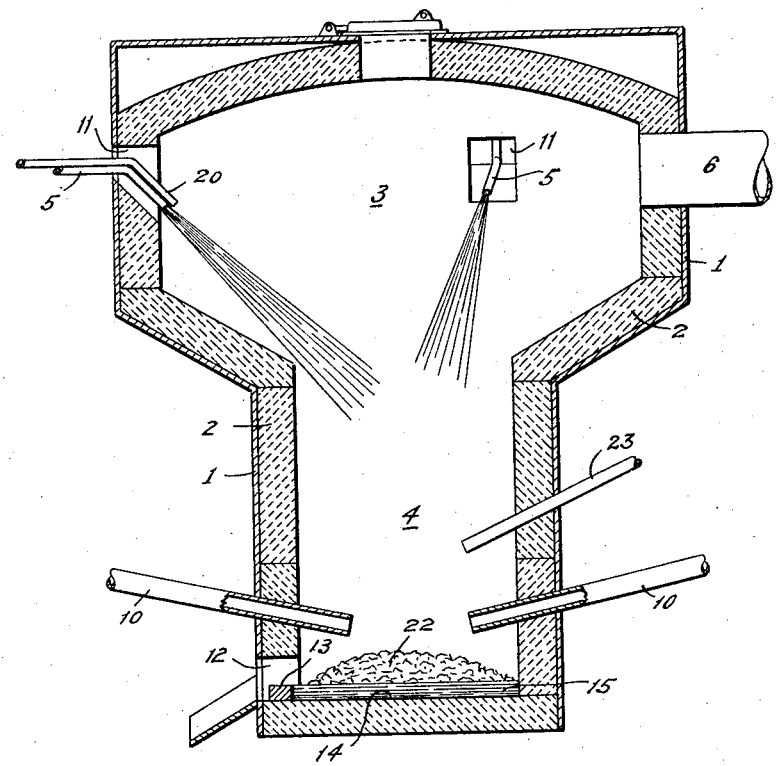
Fig. 1 is a diagrammatic sectional side view of a furnace embodying this invention and with which the process may be carried out.
Figure 2:
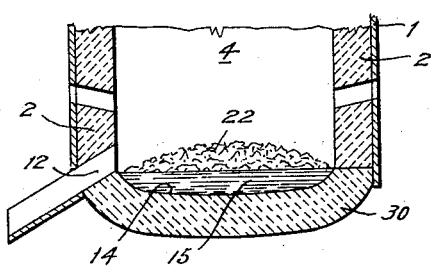
Fig. 2 is a fragmental section of the bottom of a modified form thereof.

The furnace comprises in general a casing 1 which may be lined with suitable fire resistant material 2. It may be enlarged at its upper portion as shown at 3 to provide a distillation chamber of greater cross section than the lower portion 4. Suitably disposed around the periphery of the distillation chamber are provided a plurality of spray nozzles 5 through which the waste liquors may be sprayed into the chamber while the products of combustion may be carried off by a suitable flue 6 through suitable heat regenerating or utilizing apparatus not herein shown, to be discharged.

The spray nozzles 5 are preferably arranged to project the material downwardly toward the lower chamber 4. At suitable intervals upon the side of the chamber are provided air inlets 10. Air may also be admitted through the openings 11 adjacent to the spray nozzles. The lower end of the chamber 4 is provided with an outlet 12 through which the fused chemicals, condensing within the furnace may be withdrawn.

The furnace is so conducted that there forms upon the bottom thereof a carbon mass 22, on which the unreduced chemical, either condensing from the waste liquors or introduced through a suitable pipe 23, falls. The contact is maintained between the chemical and the carbon mass of such duration that the chemical is completely reduced and may be withdrawn from the furnace in that condition.

In the practical form of maintaining this contact which is herein illustrated there is provided a pool of the molten chemical in the bottom of the furnace. To this end the outlet 12 has its lower side 13 above the level 14 of the bottom of the furnace whereby there is entrapped within the bottom of the chamber 4 a molten mass 15 of the reagents.

In the form illustrated in Fig. 1, the lower side 13 of the discharge orifice may be adjustable in height and removable whereby the operation of the furnace may be controlled at will.

In carrying out the process and in operating the apparatus, the height of the carbon mass may be regulated by controlling the feed of the waste liquors, and of the air. This mass is preferably kept at all times sufficient to cover the entire bottom of the furnace, and it has been found practical to keep it at least eighteen inches high.

The reduction may further be controlled by controlling the depth of the pool, good results have been found when this is also kept at about five inches.

For starting the furnace there may be provided suitable nozzles 20 by which oil may be introduced until the furnace is heated. Thereafter as the waste liquor is discharged through the nozzles 5, it is rapidly evaporated and brought to the point of destructive distillation substantially before these liquors pass out of the chamber 3.

The combustible gases as they are formed, pass downwardly into the chamber 4, there to be consumed by the oxygen. The hot burned gases pass through the chamber 3 to heat it and then pass out through the exhaust flue 6.

The carbonaceous material formed and the reagents to be recovered fall upon the floor of the chamber 4 on the top of the mass of carbonaceous material 22 which has previously been formed. As these reagents pass through the incandescent carbon layer, they are reduced and finally collect in the bottom as a molten layer 15 upon which the carbon mass floats. This molten layer is thus protected from oxidation by the superposed carbon layer and by the reducing atmosphere of carbonaceous gases entrained thereby.

By the above process it is possible to dispose of the waste liquors efficiently and economically, utilizing the heat units contained therein and recovering the chemicals. Moreover it is possible to convert not only the recovered chemical but also the additional supply into a form advantageous for use.

It is also to be understood that the following claims are intended to cover all of the general and specific features of the invention herein described, and all statements of the scope of the invention which, as a matter of language, might be said to fall therebetween.

We claim:—

1. The method of recovering chemicals from waste liquor which comprises destructively distilling the liquor, consuming the products of such distillation, forming a pool of the unconsumed chemicals in a molten mass and isolating said mass from the oxidizing agent present.

2. The method of recovering chemicals from waste liquor which comprises destructively distilling the liquor, consuming the products of such distillation, forming a pool of the unconsumed chemicals in a molten mass and maintaining upon said mass a protective layer of carbon to prevent oxidation.

3. The method of recovering chemicals from waste liquor which comprises destructively distilling the liquor, consuming the combustible products of such distillation, forming a pool of the non-combustible portions in a fused mass and retaining said fused mass in a pool until reduction is substantially complete.

4. The method of recovering chemicals from waste liquor which comprises destructively distilling the liquor and consuming the combustible portions thereof and isolating the non-combustible portions thereof from contact with the air within a pool.

5. The process of recovering chemicals from waste liquors which comprises spraying the same into a hot chamber, consuming the combustible portions thereof in said chamber, collecting upon the bottom of said chamber a heated mass composed largely of carbon upon which the non-combustible portions of said liquors are deposited to be reduced thereby while passing therethrough, whereby said non-combustible portions appear in molten form beneath said mass, and retaining said molten material in a pool until reduction is substantially completed.

6. The process of recovering chemicals from waste liquors which comprises discharging the same downwardly in a heated chamber toward the bottom thereof whereby the liquors are destructively distilled, consuming the combustible gases thus formed to maintain the heat of the chamber, maintaining upon the bottom of the chamber a carbonaceous mass whereby the non-combustible portions of said liquor fall upon said mass to be reduced thereby, and maintaining said molten mass in a pool within said chamber until reduction is substantially complete.

7. The process of reducing chemicals which comprises adding the chemical to an incandescent mass of carbon, maintaining an oxygen supply for the mass, maintaining a molten pool of the fused chemical on which the said mass floats and withdrawing the chemical from said pool, whereby the chemical is reduced on passing through the mass and the reduced chemical is protected by the mass from oxidation.

8. The method of recovering reagent chemicals from waste liquors which comprises destructively distilling the waste liquors to produce carbon and keeping the carbon at incandescence, and maintaining the contact between the carbon and chemicals until the chemicals are completely reduced, in a smelting pool under the carbon.

9. The process of recovering and reducing reagent chemicals from waste liquors which comprises destructively distilling said waste liquors, consuming the volatiles, maintaining an incandescent mass of carbon, withdrawing the reduced chemicals from a pool formed below said mass, and so regulating the operating conditions as to produce said carbon mass from the waste liquors, in quantity sufficient to protect the reduced chemical from oxidation.

10. The process of recovering reagent chemicals from waste liquors which comprises heating the waste liquors to separate out the chemical in fused condition, maintaining a pool of the fused chemical and maintaining floating upon said pool a mass of incandescent carbon and so regulating the operating conditions as to generate said mass from the carbonaceous matter of the waste liquors.

In testimony whereof we affix our signatures.

CHARLES L. WAGNER.
HORACE FREEMAN.